United States Patent
Champion

(10) Patent No.: US 10,300,740 B2
(45) Date of Patent: May 28, 2019

(54) WHEEL HUB BEARING BORE

(71) Applicant: Honeywell International Inc., Morristown, NJ (US)

(72) Inventor: Jon Champion, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 421 days.

(21) Appl. No.: 14/752,458

(22) Filed: Jun. 26, 2015

(65) Prior Publication Data

US 2016/0031259 A1  Feb. 4, 2016

Related U.S. Application Data

(60) Provisional application No. 62/031,052, filed on Jul. 30, 2014.

(51) Int. Cl.
| | | |
|---|---|---|
| *B60B 27/00* | (2006.01) | |
| *B60B 27/02* | (2006.01) | |

(Continued)

(52) U.S. Cl.
CPC ............ *B60B 27/001* (2013.01); *B60B 27/00* (2013.01); *B60B 27/0078* (2013.01);

(Continued)

(58) Field of Classification Search
CPC ....... B60B 27/00; B60B 27/02; B60B 27/001; B60B 27/0078; B64C 25/36; F16C 35/067; F16C 35/07

(Continued)

(56) References Cited

U.S. PATENT DOCUMENTS

| 543,301 | A | * | 7/1895 | Grant | .................... | F16C 19/386 |
| | | | | | | 384/589 |
| 691,922 | A | * | 1/1902 | Whitely et al. | ........ | F16C 19/386 |
| | | | | | | 384/589 |

(Continued)

FOREIGN PATENT DOCUMENTS

| CN | 1217807 C | 9/2005 |
| CN | 201380719 Y * | 1/2010 |

(Continued)

OTHER PUBLICATIONS

Extended European Search Report from counterpart European Application No. 15177412.2, dated Feb. 12, 2016, 9 pp.

(Continued)

*Primary Examiner* — S. Joseph Morano
(74) *Attorney, Agent, or Firm* — Shumaker & Sieffert, P.A.

(57) ABSTRACT

In some examples, an aircraft wheel assembly includes an axle, a bearing assembly, and a hub defining a bearing bore. The bearing bore may be configured such that the dynamic radial and axial thrust bearing reactions between the axle and the hub results in a first reaction force $F_R$ applied to the hub, the first reaction force $F_R$ having a radial component, and a second reaction force $F_N$ applied to the hub, the second reaction force $F_N$ having both a radial and an axial component.

14 Claims, 4 Drawing Sheets

(51) Int. Cl.
*F16C 35/067* (2006.01)
*B64C 25/36* (2006.01)
*B60B 21/10* (2006.01)
*F16C 19/36* (2006.01)
*F16C 19/54* (2006.01)

(52) U.S. Cl.
CPC .............. *B60B 27/02* (2013.01); *B64C 25/36* (2013.01); *F16C 35/067* (2013.01); *B60B 21/104* (2013.01); *B60B 2310/202* (2013.01); *B60B 2310/208* (2013.01); *B60B 2310/226* (2013.01); *B60B 2310/228* (2013.01); *B60B 2310/231* (2013.01); *B60B 2310/232* (2013.01); *B60B 2310/234* (2013.01); *B60B 2360/102* (2013.01); *B60B 2360/104* (2013.01); *B60B 2380/14* (2013.01); *B60B 2380/70* (2013.01); *B60B 2900/212* (2013.01); *B60B 2900/321* (2013.01); *B60B 2900/711* (2013.01); *B60Y 2200/51* (2013.01); *F16C 19/364* (2013.01); *F16C 19/548* (2013.01); *F16C 2326/02* (2013.01); *F16C 2326/43* (2013.01)

(58) Field of Classification Search
USPC ................................................ 384/589, 626
See application file for complete search history.

(56) References Cited

U.S. PATENT DOCUMENTS

| | | | |
|---|---|---|---|
| 992,949 A * | 5/1911 | Eveland | F16C 19/36 384/589 |
| 1,383,758 A * | 7/1921 | Robinson | F16C 33/547 384/589 |
| 1,950,592 A * | 3/1934 | Bock | B60B 27/00 29/898.07 |
| 2,052,524 A * | 8/1936 | Baker | B60B 27/001 301/1 |
| 3,237,288 A * | 3/1966 | Hogan | B21K 1/28 29/894.362 |
| 4,244,631 A * | 1/1981 | Cadaret | F16C 35/06 384/589 |
| 5,031,967 A | 7/1991 | Svensson | |
| 5,862,890 A * | 1/1999 | Long | F16D 55/36 188/71.5 |
| 6,146,022 A | 11/2000 | Sahashi et al. | |
| 6,149,244 A | 11/2000 | Wagner | |
| 6,244,751 B1 | 6/2001 | Rode | |
| 6,550,510 B2 | 4/2003 | Champion | |
| 6,559,564 B1 | 5/2003 | Itou | |
| 6,659,650 B2 | 12/2003 | Joki et al. | |
| 6,821,208 B2 | 11/2004 | Krude et al. | |
| 6,857,786 B2 | 2/2005 | Csik | |
| 7,369,966 B1 | 5/2008 | Scelsi et al. | |
| 7,506,940 B2 | 3/2009 | White | |
| 7,670,059 B2 | 3/2010 | Gradu et al. | |
| 8,444,324 B2 * | 5/2013 | Proeschel | B60B 25/08 384/589 |
| 2001/0046339 A1 | 11/2001 | Miyazaki et al. | |
| 2003/0063827 A1 | 4/2003 | Webb et al. | |
| 2008/0199121 A1 | 8/2008 | Komori et al. | |
| 2009/0108667 A1 | 4/2009 | Clark et al. | |
| 2010/0303395 A1 | 12/2010 | Langer et al. | |
| 2011/0097027 A1 | 4/2011 | Im et al. | |
| 2013/0230265 A1 | 9/2013 | Hubbard et al. | |
| 2013/0287519 A1 | 10/2013 | Weiss | |
| 2014/0023306 A1 | 1/2014 | Beck et al. | |

FOREIGN PATENT DOCUMENTS

| | | |
|---|---|---|
| EP | 1122094 A2 | 8/2001 |
| EP | 2392478 A2 | 12/2011 |
| EP | 2543900 A2 * | 1/2013 |
| EP | 2749431 A2 | 7/2014 |
| GB | 1285311 | 8/1972 |
| WO | 2007075386 A2 | 7/2007 |
| WO | 2009013048 A2 | 1/2009 |
| WO | 2012122993 A1 | 9/2012 |
| WO | 2013029638 A1 | 3/2013 |

OTHER PUBLICATIONS

"Fatigue Cracking That Originated at a Material Defect in a Forged Aircraft Wheel Half," from ASM International, retrieved from http://products.asminternational.org/fach/data/fullDisplay.do?database=faco&record=271&search=on Aug. 13, 2014, 2 pp.
Shipley et al., "Analysis of Distortion and Deformation," ASM Handbook, vol. 11, Failure Analysis and Prevention, 2002, 593 pp.
Response to Extended Search Report dated Feb. 12, 2016, from counterpart European Application No. 15177412.2, filed Aug. 25, 2016, 14 pp.
First Office Action and Search Report, and translation thereof, from counterpart Chinese Application No. 201510453474.6, dated Jul. 20, 2018, 15 pp.

* cited by examiner

WHEEL HUB BEARING BORE

This application claims the benefit of U.S. Provisional Patent Application No. 62/031,052, which was filed on Jul. 30, 2014 and is entitled, "WHEEL HUB BEARING BORE," the entire content of which is incorporated herein by reference.

TECHNICAL FIELD

The disclosure relates to a wheel assembly, such as for an aircraft.

BACKGROUND

Aircraft wheel assemblies are subject to a variety of forces during aircraft operation, including, e.g., during take-off, landing, and braking operations. Various mechanisms have been employed to counteract such forces on the wheel assembly and to maintain the integrity and operational characteristics of the assembly under the influence of such forces.

SUMMARY

In general, the disclosure describes a vehicle wheel assembly that includes an axle, a bearing assembly, and a hub defining a bearing bore, where the bearing bore is configured such that the dynamic radial and axial thrust bearing reactions between the axle and the hub results in a first reaction force $F_R$ applied to the hub, the first reaction force $F_R$ having a radial component, and a second reaction force $F_N$ applied to the hub, the second reaction force $F_N$ having both a radial component and an axial component. The wheel assembly may be, for example, a wheel assembly of an aircraft.

The configuration of the hub may help improve the performance of the assembly, e.g., compared to a hub having a convention bearing bore configuration (e.g., shape and geometry). For example, the configuration of the hub may reduce wear, improve longevity, and generally improve the so-called fatigue life of the assembly. The bearing bore radius may be defined by the region of the hub adjacent to the radial contact of the bearing assembly and the axial contact of a bearing spacer (also referred to as a "bearing block") of the bearing assembly to the hub. The disclosure is also directed to a method of forming the hub and, in some examples, the wheel assembly.

In one example, the disclosure describes a vehicle wheel assembly comprising an axle, a bearing assembly, and a hub configured to rotate relative to the axle and defining a bearing bore, wherein the bearing assembly is positioned between the axle and the hub, and wherein the bearing bore is configured such that a reaction between the axle and the hub results in a first reaction force $F_R$ applied to the hub, the first reaction force $F_R$ having a radial component, and a second reaction force $F_N$ applied to the hub, the second reaction force $F_N$ having both a radial and an axial component.

In another aspect, the disclosure describes a method comprising forming a hub defining a bearing bore, wherein the bearing bore is configured such that when the hub is mounted on an axle of a vehicle via a bearing assembly, a reaction between the axle and the hub results in a first reaction force $F_R$ applied to the hub, the first reaction force $F_R$ having a radial component, and a second reaction force $F_N$ applied to the hub, the second reaction force $F_N$ having both a radial and an axial component. The method further comprises cold working the bearing bore.

In another aspect, the disclosure describes a method comprising positioning a bearing assembly on an axle of a vehicle wheel assembly, and mounting a hub on the axle, wherein the bearing assembly is positioned between the axle and the hub, and the hub configured to rotate relative to the axle and defines a bearing bore, and wherein the bearing bore is configured such that a reaction between the axle and the hub results in a first reaction force $F_R$ applied to the hub, the first reaction force $F_R$ having a radial component, and a second reaction force $F_N$ applied to the hub, the second reaction force $F_N$ having both a radial and an axial component.

The details of one or more examples are set forth in the accompanying drawings and the description below. Other features, objects, and advantages of the disclosure will be apparent from the description and drawings, and from the claims.

Figure 2:
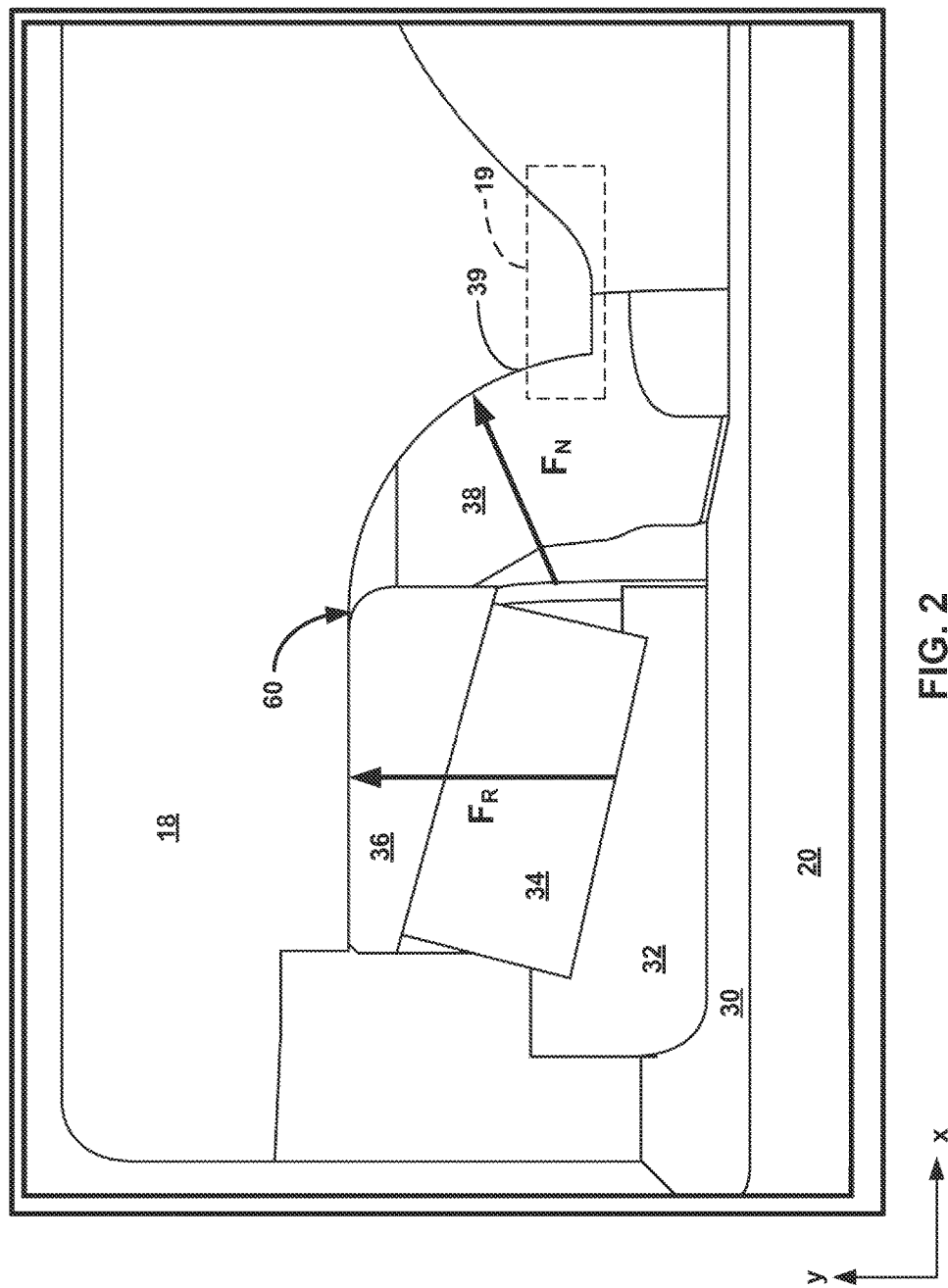
FIG. 2 is a zoomed-in view of a portion of the aircraft wheel assembly shown in FIG. 1.

FTC. 4B illustrates a conceptual cross-sectional view of the example aircraft wheel assembly of FIG. 2 and illustrates example compound radii of the bearing bore.

DETAILED DESCRIPTION

In some examples, a wheel assembly of a vehicle, such as an aircraft, includes an axle, a wheel, a hub, and a bearing assembly, which is configured to enable the aircraft wheel to rotate relative to the axle, which may be fixed to the vehicle. The rotation of the aircraft wheel may be referred to herein as "wheel roll." The hub may define at least one bearing bore configured to engage with the bearing assembly. The bearing bore may, for example, define a surface with which the bearing assembly engages with the hub. The bearing bore may define a radius (also referred to herein as a "bearing bore radius"), which may be defined by the region adjacent to the radial contact of the bearing assembly to the hub and the region adjacent to the axial contact of a bearing spacer of the bearing assembly to the hub. While an aircraft wheel assembly is primarily referred to herein, the examples disclosed herein, such as the hub configurations and bearing assembly configurations, are applicable to wheel assemblies of other vehicles, such as automobiles.

A challenging area to design for fatigue life in an aircraft wheel, as well as some other vehicle wheels, can be the bearing bore radius. The fatigue life may generally refer to the amount of time that the aircraft wheel assembly can operate in an acceptable working condition. General wear and tear, the amount of localized stress, as well as external factors, such as weather or exposure to elements, may affect the fatigue life of the aircraft wheel assembly. The wheel assembly described herein may reduce susceptibility to one or more of these factors and may generally extend the fatigue life relative to other wheel assemblies. By extending the fatigue life, the wheel assembly may require less frequent maintenance, which may include repair or replacement of one or more components of the wheel assembly, such as the hub.

The dynamic radial and axial thrust bearing reactions into the wheel hub during wheel roll may produce relatively significant stress levels in the hub that contribute to limiting the fatigue life of a wheel assembly. As described herein, modifying the local geometry of the bearing bore and modifying compressive residual stresses through a cold working process of the hub, such as shot peen or roll burnishing of the bearing bore of the hub, may be useful for increasing the fatigue life of the wheel assembly. The real estate to provide the necessary bearing bore geometry to facilitate the ease of cold working can be limited, due to the limited space between the hub and the bearing assembly. Cold working may also be referred to as work hardening or strain hardening, and may be used to strengthen a metal by plastic deformation.

The hub described herein, as well as an aircraft wheel assembly comprising the hub, is configured such that the bearing bore radius defined by the hub is configured to distribute the stresses attributable to the dynamic radial and axial thrust bearing reactions into the wheel hub during wheel roll in a manner that helps increase the fatigue life of the aircraft. A conventional geometric configuration of a bearing bore results in a pure radial contact surface configured to take the radial reaction force applied to the hub from the bearing assembly during wheel roll, and a vertical thrust face configured to take the axial reaction forces applied to the hub during the wheel roll. Thus, in a conventional geometry configuration of a bearing bore radius, the bearing reactions are divided into purely separate radial and axial components.

In contrast, the bearing bore configuration disclosed herein is configured such that, instead of a pure axial reaction force applied to the hub, a reaction force with both a radial component and an axial component is applied to the hub from the bearing assembly during wheel roll. In addition, there is a radial reaction force applied to the hub from the bearing assembly during wheel roll. The reaction force having both radial and axial components may help control the direction and position of the reaction load, through the geometry, to minimize stress in the hub by reducing the moment caused by the reaction. Finite Element bases fatigue analysis has demonstrated that this bearing bore configuration may improve fatigue life in the bearing bore by more than a factor of two.

The geometry of the bearing bore described in this disclosure may also allow for a relatively large bearing bore radius, which may further reduce the stress concentration effect on the hub. For example, the larger bearing bore radius may facilitate the ease of the cold working process on the hub, and may enable the use of a roll burnishing technique, which may be relatively effective, to produce higher compressive residuals that may prolong wheel fatigue life. An aircraft wheel assembly including the hub with the increased bearing bore radius disclosed herein may also include a larger bearing spacer (as compared to a conventional wheel assembly that has a bearing bore radius that results in bearing reactions with separate radial and axial components) configured to engage with the hub at the bearing bore surfaces. In some examples, the geometry between the hub at the bearing bore and the bearing block of the bearing assembly is changed along the intersection of the bearing bore and bearing block (also referred to herein as a bearing spacer), e.g., "feathered" away, to help minimize stress peaking at the edges of contact and help direct the reaction load through a thicker section of the wheel hub.

Figure 1:
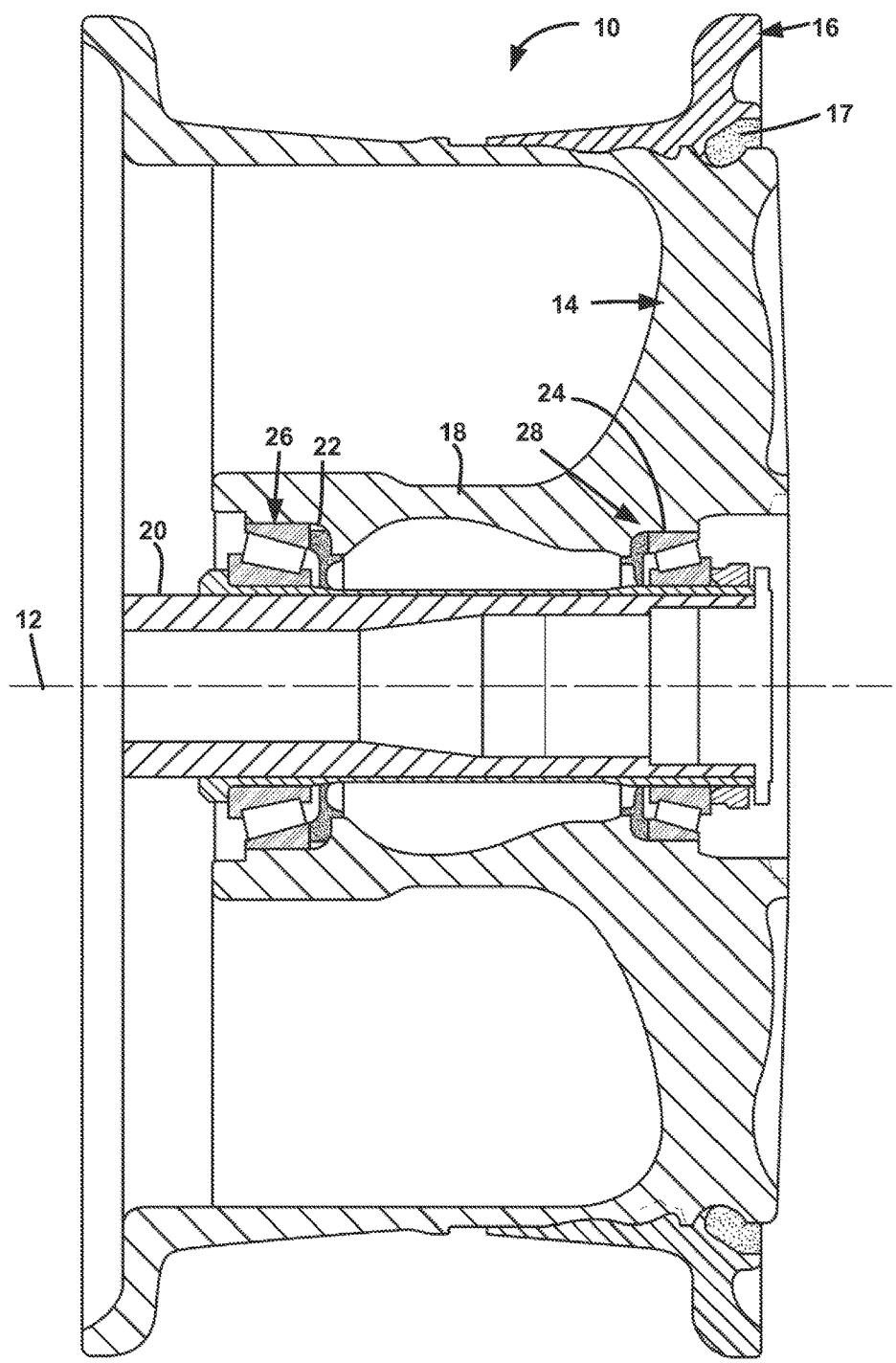
FIG. 1 is a conceptual cross-sectional view of an example aircraft wheel assembly including a hub that defines at least one bearing bore configured such that forces applied to the hub, from the interaction with an axle of the assembly, include a first reaction force having a radial component, and a second reaction force having both a radial component and an axial component.

FIG. 1 is a conceptual cross-sectional view of an example aircraft wheel assembly 10. Assembly 10 is a flange retained aircraft wheel assembly. The hub configuration described herein, however, may be applied to other types of wheel assemblies. In FIG. 1, wheel assembly 10 has a longitudinal axis 12 about which the assembly rotates during operation of the vehicle to which the wheel is attached. Wheel assembly 10 may be employed in a number of different types of vehicles, including, e.g., a number of different types of aircraft and automotive vehicles. Wheel assembly includes inboard annular wheel component 14 and outboard annular wheel component 16 which together support a tire (not shown) thereon. Outboard wheel component 16 can be axially secured to inboard wheel component 14 using any suitable technique, such as a lock ring 17.

Inboard annular wheel component 14 includes hub 18. In the example of FIG. 1, hub 18 is generally cylindrical. However, in other examples, hub 18 may assume a variety of shapes. Hub 18 may define a number of axially spaced (spaced along axis of rotation 12) annular recesses configured to receive bearing assemblies for supporting inboard wheel component 14, and thereby wheel assembly 10, for rotation on axle 20 having axis of rotation 12 as its center. The recesses may be referred to as bearing bores. Two bearing bores 22, 24, and respective bearing assemblies 26, 28 are shown in the example of FIG. 1.

Bearing bores 22, 24 defined by hub 18 include surfaces that interface with axle 20, e.g., via bearing assemblies 26, 28. In particular, bearing assemblies 26, 28 are positioned between axle 20 and the respective bearing bores 22, 24.

The components of wheel assembly 10 may be fabricated using a number of solid material manufacturing techniques, including, e.g., forging, casting, molding, or one or more material removal processes, including, e.g., milling, turning, grinding, electrical discharge machining (EDM), or laser or torch cutting. In the latter process, the material may be removed from a starting piece of material.

Hub 18 may be subject to relatively high stresses at a region between bearing assemblies 26, 28 and hub 18. For example, during a ground operation of an aircraft including wheel assembly 10, the interaction between axle 20 and hub 18 via bearing assemblies 26, 28 may cause relatively high reaction forces to be applied to hub 18. These reaction forces may fatigue hub 18 over time. As described in further detail with respect to FIGS. 2 and 4A, bearing bores 22, 24 are configured to help minimize the fatigue of hub 18 by at least distributing the reaction forces applied to hub 18 from axle 20 (via bearing assemblies 26, 28) in a manner that helps reduce the moment caused by the forces.

In addition, in some examples, bearing bores 22, 24 are configured (e.g., the size and geometry may be selected) such that the reaction threes are distributed to relatively thick portions of hub 18 (e.g., the thickest portion of hub 18 or at least not through the thinnest portion of hub 18) in order to better direct the reaction forces to regions of hub 18 that may be better able to withstand the forces (e.g., due to the force being able to act through a relatively large distance), as compared to other, thinner regions of hub 18. The thickness of hub 18 may be measured, for example, from a surface of bearing bore 22 (or bearing bore 24) to an opposite surface of hub 18. In these ways, bearing bores 22, 24 may be configured to help improve the fatigue life of hub 18, at least relative to a conventional bearing bore configuration. Hub 18 may be formed from any suitable material, such as, but not limited to an aluminum alloy (e.g., Aluminum 2014-T6, which is an aluminum alloy having a density of about 2.8 grams per cubic centimeter (g/cc)).

The remainder of the disclosure describes bearing bore 22 and bearing assembly 26 for ease of description. The description of bearing bore 22 and bearing assembly 26, however, may also apply to other bearing bores and bearing assemblies of aircraft wheel assembly 10, such as bearing bore 24 and bearing assembly 28.

FIG. 2 illustrates a zoomed-in view of a portion of aircraft wheel assembly 10 of FIG. 1. Orthogonal x-y axes are shown in FIG. 2 to aid the description of the figure. Axis of rotation 12 extends along the x-axis. As shown in FIG. 2, in some examples, assembly 10 includes hub 18, axle 20, bearing bore 22, and bearing assembly 26, which engages with bearing bore 22. In the example shown in FIG. 2, bearing assembly 26 includes axle sleeve 30, bearing cone 32, bearing roller 34, bearing cup 36, and bearing spacer 38. In other examples, bearing assembly 26 can have another suitable configuration. The components of bearing assembly 26 may be formed from any suitable material, such as, but not limited to, steel or aluminum. For example, axle sleeve 30, bearing cone 32, bearing roller 34, and bearing cup 36 may be formed from steel and bearing spacer 38 may be formed from aluminum.

Axle sleeve 30 may be configured to engage with axle 20, e.g., may be in direct contact with axle 20. Bearing cone 32 is positioned between axle sleeve 30 and bearing roller 34 and is configured to support bearing roller 34 on axle 20. Bearing roller 34 is positioned between bearing cone 32 and bearing cup 36 and is configured to provide relative rotational movement between bearing cone 32 and bearing cup 36. Bearing spacer 38 is positioned between hub 18 and bearing cone 32, bearing roller 34, and bearing cup 36. In the example shown in FIG. 2, axle sleeve 30, bearing cone 32, bearing roller 34, and bearing cup 36 are each axisymmetric (e.g., cylindrical).

In other examples, bearing assembly 26 can include other configurations that helps rotationally support hub 18 on axle 20, i.e., mechanically mounts hub 18 to axle 20 and allows hub 18 to rotate relative to axle 20. For example, bearing assembly 26 can include a fewer or greater number of components than that shown in the example of FIG. 2. Regardless of the specific configuration of bearing assembly 26, bearing bore 22 defined by hub 18 may be configured such that the dynamic radial and axial thrust bearing reactions between axle 20 and hub 18 results in a first reaction force $F_R$ applied to hub 18, the first reaction force $F_R$ having a radial component, and a second reaction force $F_N$ applied to hub 18, the second reaction force $F_N$ having both a radial component and an axial component, as described in greater detail below.

As shown in FIG. 2, during a ground operation of an aircraft, dynamic radial and axial thrust bearing reactions between axle 20, bearing assembly 26, and hub 18 may cause reaction forces $F_R$ and $F_N$ to be applied to hub 18. In contrast to the reaction forces in a conventional hub design, reaction force $F_N$ has both axial and radial components, which helps to direct the reaction forces to a thicker portion of hub 18 and reduces a moment arm of the force applied to hub 18.

Figure 3:
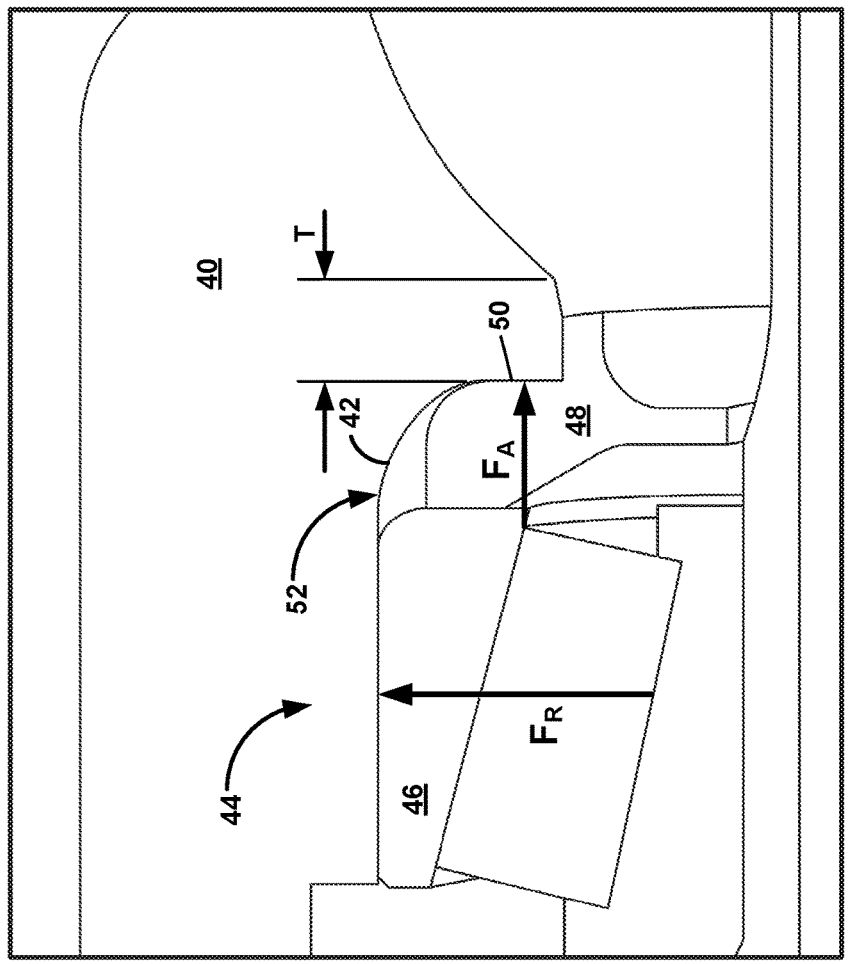
FIG. 3 is a conceptual cross-sectional view of an example aircraft wheel assembly that includes a hub defining a bearing bore having a configuration that results in bearing reactions having separate radial and axial components.

The stress distribution provided by the bearing bore 22 configuration shown in FIG. 2 is different than the stress distribution that may be observed in a conventional bearing bore configuration. FIG. 3 is a conceptual cross-sectional view of a part of an example aircraft wheel assembly, and, in particular, illustrates hub 40 defining bearing bore 42 and bearing assembly 44 including bearing cup 46 and bearing spacer 48. In contrast to bearing bore 22 of assembly 10, bearing bore 42 has a geometry that causes the bearing reactions between hub 40 and bearing assembly 44 to be divided into a pure radial component $F_R$ at a radial contact between hub 40 and bearing cup 46, and a pure axial component $F_A$, which is applied to a vertical thrust face 50 between bearing spacer 48 to hub 40. Vertical thrust face 50 may be oriented along the y-axis, and may be substantially perpendicular to an axis of rotation of hub 40. Due to these stresses, region 52 may be subject to high stresses that may lead to low fatigue life for hub 40 (e.g., may require hub 40 to be replaced relatively early). In addition, the application of the axial stress $F_A$ to a relatively thin (e.g., as shown as thickness T in FIG. 3) portion of hub 40 may cause shearing of hub 40. Vertical thrust face 50 may be a surface defined by hub 40 that extends substantially along the y-axis (e.g., along the y-axis or generally along the y-axis).

As shown in FIG. 2, in contrast to hub 40 having a configuration that results in reaction forces applied to hub 40 from an axle including an axial stress $F_A$ and a separate pure radial component $F_R$, hub 18 of assembly 10 defines bearing bore 22 having a geometry that helps distribute the stresses applied to hub 18 from axle 20 into reaction force $F_N$ (FIG. 2) with both a radial component and an axial component. The configuration of bearing bore 22 also results in reaction force $F_R$.

Bearing bore 22 can be configured (e.g., by both geometry, such as a compound radius, and size) such that a centroid of reaction force $F_N$ is tailored to act at a smaller moment arm relative to a high stress location 60, as compared to bearing bore 42 shown in FIG. 3, thus reducing a bending moment. For example, bearing bore 22 may be configured such that load $F_N$ is acting at a shorter distance from region 60 than axial force $F_A$ (FIG. 3), which may be subject to relatively high fatigue, to generate a smaller moment arm and generate smaller bending stresses in region 60. High stress location 60 (e.g., a high stress point) may be adjacent to the end of the contact between bearing cup 36 and hub 18, near the tangency point defined by the hub horizontal and start of the bearing bore 22 compound radius.

In some examples, hub 18 of assembly 10 is configured such that the reaction forces applied to hub 18 from axle 20 do not act on any vertical faces of hub 18. For example, as shown in FIG. 2, bearing bore 22 is configured to include a curvilinear surface 39 (in cross-section), without a vertical face like vertical face 50 shown in FIG. 3 (the vertical direction being measured in the y-direction, where orthogonal x-y axes are shown in FIG. 2 for ease of description only). This may further help distribute the forces along hub 18 to improve the fatigue life of hub 18 relative to hub 40 shown in FIG. 3. In some examples, vertical face 50 may be planar; in contrast, in some examples, bearing bore 22 does not include any planar surfaces, but, rather, defines curve surfaces that engage with bearing assembly 26.

As shown in FIG. 2, bearing bore 22 of hub 18 is configured such that load having an axial component, load $F_N$, may act through a relatively thick section of hub 18 (e.g., thicker than in the design shown in FIG. 3 and not through the thinnest section of hub 18, which may be region 19 shown in FIG. 2), thereby reducing the shear force applied to hub 18. The thickness of hub 18 may be measured in a direction from a surface of hub 18 defining bearing bore 22 to an outer surface or hub 18.

Reducing the shear force applied to hub 18 may also help prevent shear out of hub 18 or increase the time required for shear out to occur, thereby improving fatigue life of hub 18.

In addition, as shown in FIG. 2, bearing spacer 38 is larger than bearing spacer 48 (FIG. 3) in order to accommodate and help fill the larger bearing bore 22 that results from replacing vertical thrust face 50 with curvilinear face 39. Due to the larger bearing spacer 38, the surface area with which bearing assembly 26 contacts hub 18 (at both bearing spacer 38 and bearing cup 36) is larger than the surface area with which bearing assembly 44 contacts bearing bore 42 (FIG. 3). This may help improve the fatigue life of hub 18, particularly when compared to hub 40. For example, the larger bearing spacer 38 may provide a larger surface area over which the forces may be distributed to hub 18.

As described above, bearing bore 22 in accordance with the disclosure differs from a conventional bearing bore 42 in that the radius of bearing bore 22 is configured such that the reactions forces applied to hub 18 from axle 20 are recharacterized from a purely radial load $F_R$ and axial load $F_A$ to a radial load $F_R$ and combined normal load $F_N$. In the example shown in FIG. 2, bearing bore 22 does not include a constant radius of curvature in cross-section (where the cross-section is taken parallel axis of rotation 12), but, rather has a non-constant radius of curvature defined by a compound radius. The curvilinear cross-sectional gemoetry of bearing bore 22 may allow bearing bore 22 to have a larger compound radius compared to bearing bore of 42 of hub 40 (FIG. 3), which includes a planar vertical surface 50. By increasing the compound radius of bearing bore 22 (as measured in cross-section, as shown in FIG. 4B), the direction of the axial force $F_A$ previously acting on region 60 may be controlled to include both axial and radial components, as indicated by force $F_N$, which may help direct the reaction forces to a portion of hub 18 that is relatively thick and, therefore. reduce the possibility of shear out of hub 18 due to the reaction forces.

Due to the relatively tight radius of conventional bearing bore 42, roll burnishing of hub 18 in at least the region of bearing bore 42 may be relatively difficult. The larger compound bore radius of bore bearing 22 may allow for easier cold working of bore bearing 22 compared to the conventional bearing bore 42, thereby allowing for a more effective cold work methods such as roll burnishing, rather than shot peening. The higher residual stress of a more effective cold working process may further improve fatigue life of hub 18, as compared to hub 40 with a smaller radius.

The fatigue life (at least in region 60) of hub 18 may increase, as compared to hub 40 defining a bearing bore 42 having a geometry that includes both pure radial load ($F_R$) and axial loads ($F_A$). For example, the configuration of bearing bore 22 may reduce stress in region 60 by a factor of about three to about four. However, the effectiveness of improving fatigue life may vary with the particular aircraft wheel assembly.

Figure 4A:
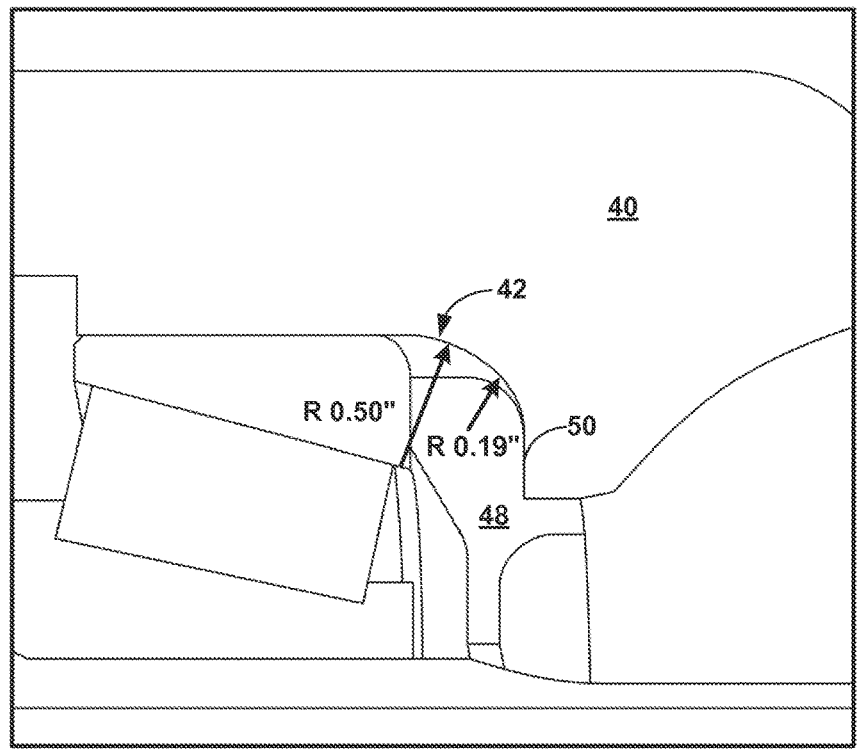
FIG. 4A illustrates the example aircraft wheel assembly of FIG. 3 and illustrates example compound radii of the bearing bore.
Figure 4B:
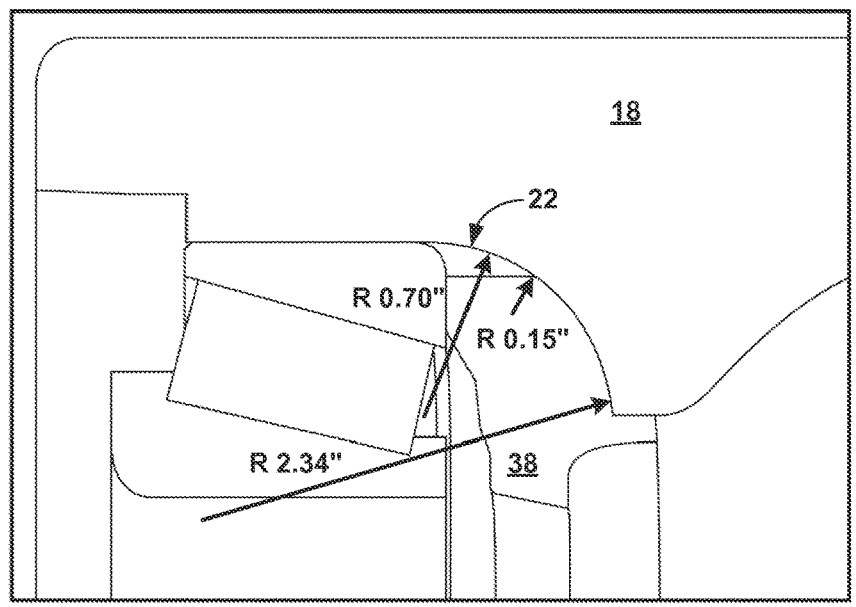

FIGS. 4A and 4B illustrate an example of how the compound radii of bearing bore 22 may differ from the conventional bearing bore 42. FIG. 4A illustrates an example conventional bearing bore 42 in which radii of 0.50 inches (about 1.27 cm) and about 0.19inches (about 0.48 cm) make up the compound radius of hub 40. Hub 40 contacts bearing spacer 48 at a vertical face 50.

FIG. 4B illustrates an example configuration of bearing bore 22. Bearing bore 22 is defined by a compound radius of curvature that includes a first radius that is further from axle 20 and a second radius greater than the first radius, the second radius being closer to the axle 20 when hub 18 is mounted on axle 20. The centers of the first and second radii do not coincide. In some examples, the second radius is about one-third (⅓) the first radius. However, each bearing bore 22 configuration may have a different ratio of first and second radii, which may be selected based on available real estate to work with. A second radius that is about ⅓(e.g., ⅓or nearly ⅓) of the first radius may be a starting point prior to optimizing the first and second radii using Finite Element Analysis or another force analysis technique.

In the example shown in FIG. 4B, the radii of about 0.70 inches (about 1.78 centimeters (cm)) and about 2.34 inches (about 5.94 cm) make up the compound bore radius of bearing bore 22 of hub 18. The 0.70 inch first radius sweeps through most of the compound bore radius, with the 2.34 inch second radius at the very lower end, closer to axle 20, to define a gradual "feathering away" of the contact between hub 18 and bearing spacer 38, e.g., a gradual and smooth departure of the contact surfaces of hub 18 and bearing spacer 38. The radius of the compound radius of the spacer 38 is predominately 0.70 inches throughout contact with hub 18, but transitions to a 0.15 inch (0.38 cm) radius at the upper end to help "feather" the contact of the spacer 38 away from hub 18.

In other examples of hub 18, other radii of curvature may be used to define bearing bore 22. The radii of curvature may depend on the relative size of bearing bore 22, the available real estate to modify the radii of curvatures of bearing bore 22, and driving load conditions.

In example methods of forming hub 18, bearing bore 22 may be defined and then cold worked (e.g., via. shot peen or roll burnishing). Bearing bore 22 may be defined to have geometry such that when the hub is mounted on an axle of a vehicle via a bearing assembly, a reaction between the axle and the hub results in a first reaction force $F_R$ applied to the hub, the first reaction force $F_R$ having a radial component, and a second reaction force $F_N$ applied to the hub, the second reaction force $F_N$ having both a radial and an axial component. In some examples, this geometry may be achieved by, for example, defining bearing bore 22 that has a curvilinear cross-sectional profile without any planar surfaces. In some examples, the hub can be formed by, for example, at least one of forging, casting, or molding the hub from a suitable material. In other examples, forming the hub comprises at least one of milling, turning, grinding, electrical discharge machining (EDM), or laser or torch cutting the hub from a starting piece of material.

In example methods of forming assembly 10, axle 20, bearing assembly 26, and hub 18 haying the configuration described herein may be assembled together. For example, the method may include positioning bearing assembly 26 on axle 20 of wheel assembly 10, and mounting hub 18 on axle 20, wherein bearing assembly 26 is positioned between axle 20 and hub 18. Bearing assembly 26 is configured to permit hub 18 to rotate relative to axle 20. In some examples, mounting hub 18 on the axle comprises mounting inboard annular wheel component 14 (FIG. 1) comprising hub 18 on axle 20, and the method may further comprise connecting outboard annular wheel component 16 (FIG. 1) to inboard wheel component. Inboard annular wheel component 14 and outboard annular wheel component 16 may be configured to support a tire.

Various examples have been described. These and other examples are within the scope of the following claims.

What is claimed is:

1. A vehicle wheel assembly comprising:
an axle;
a bearing assembly comprising a bearing spacer defining a compound radius; and
a hub configured to rotate relative to the axle and defining a bearing bore, wherein the bearing assembly is positioned between the axle and the hub, the bearing spacer being configured to engage with the hub within the bearing bore, and the bearing bore being configured such that an interface between the hub and the bearing spacer does not include a surface that is perpendicular to an axis of rotation of the axle, and wherein the bearing bore is configured such that a reaction between the axle and the hub results in a first reaction force $F_R$ applied to the hub, the first reaction force $F_R$ having a radial component, and a second reaction force $F_N$ applied to the hub, the second reaction force $F_N$ having both a radial and an axial component.

2. The vehicle wheel assembly of claim 1, further comprising:
an inboard annular wheel component comprising the hub; and
an outboard annular wheel component configured to engage with the inboard annular wheel component, the inboard annular wheel component and the outboard annular wheel component being configured to support a tire.

3. The vehicle wheel assembly of claim 1, wherein the bearing bore is configured to distribute the first reaction force and the second reaction force between the hub and the axle through a thickest portion of the hub.

4. The vehicle wheel assembly of claim 1, wherein the bearing assembly further comprises:
an axle sleeve configured to contact the axle;
a bearing cone;
a bearing roller, wherein the bearing cone is positioned between the bearing roller and the axle sleeve; and
a bearing cup, wherein the bearing roller is configured to provide relative rotational movement between the bearing cone and the bearing cup, and
wherein the bearing spacer is positioned between the hub and the bearing cone, bearing roller, and the bearing cup.

5. The vehicle wheel assembly of claim 1, wherein the bearing bore has a compound radius comprising a first radius of about 1.78 cm and a second radius of about 5.94cm.

6. The vehicle wheel assembly of claim 1, wherein the axle is an axle of an aircraft wheel assembly.

7. A method comprising:
forming a hub defining a bearing bore, wherein the bearing bore is configured such that when the hub is mounted on an axle of a vehicle via a bearing assembly, a reaction between the axle and the hub results in a first reaction force $F_R$ applied to the hub, the first reaction force $F_R$ having a radial component, and a second reaction force $F_N$ applied to the hub, the second reaction force $F_N$ having both a radial and an axial component, the bearing assembly comprising a bearing spacer defining a compound radius, the bearing spacer being configured to engage with the hub within the bearing bore, and the bearing bore being configured such that an interface between the hub and the bearing spacer does not include a surface that is perpendicular to an axis of rotation of the axle; and
cold working the bearing bore.

8. The method of claim 7, wherein forming the hub comprises at least one of forging, casting or molding the hub.

9. The method of claim 7, wherein forming the hub comprises at least one of milling, turning, grinding, electrical discharge machining (EDM), or laser or torch cutting the hub from a starting piece of material.

10. The method of claim 7, wherein forming the hub comprises defining the bearing bore having a compound radius comprising a first radius of about 1.78 cm and a second radius of about 5.94 cm.

11. A method comprising:
positioning a bearing assembly comprising a bearing spacer on an axle of a vehicle wheel assembly, wherein the bearing spacer defines a compound radius; and
mounting a hub on the axle, wherein the bearing assembly is positioned between the axle and the hub, and the hub configured to rotate relative to the axle and defines a bearing bore, wherein the bearing spacer is configured to engage with the hub within the bearing bore, and the bearing bore being configured such that an interface between the hub and the bearing spacer does not include a surface that is perpendicular to an axis of rotation of the axle, and wherein the bearing bore is configured such that a reaction between the axle and the hub results in a first reaction force $F_R$ applied to the hub, the first reaction force $F_R$ having a radial component, and a second reaction force $F_N$ applied to the hub, the second reaction force $F_N$ having both a radial and an axial component.

12. The method of claim 11, wherein mounting the hub on the axle comprises mounting an inboard annular wheel component comprising the hub on the axle, the method further comprising connecting an outboard annular wheel component to the inboard wheel component, the inboard annular wheel component and the outboard annular wheel component being configured to support a tire.

13. The method of claim 11, wherein the bearing bore is configured to distribute the first reaction force and the second reaction force between the hub and the axle through a thickest portion of the hub.

14. The method of claim 11, wherein the bearing assembly further comprises:
an axle sleeve configured to contact the axle;
a bearing cone;
a bearing roller, wherein the bearing cone is positioned between the bearing roller and the axle sleeve; and
a bearing cup, wherein the bearing roller is configured to provide relative rotational movement between the bearing cone and the bearing cup,
wherein the bearing spacer is positioned between the hub and the bearing cone, bearing roller, and the bearing cup.

* * * * *